United States Patent [19]

Jabusch

[11] Patent Number: 5,628,471
[45] Date of Patent: May 13, 1997

[54] SAFETY BELT REELING DEVICE WITH SAFETY BELT GUIDE DESIGNED FOR AUTOMATIC ASSEMBLY

[75] Inventor: Ronald Jabusch, Elsmhorn, Germany

[73] Assignee: Autoliv Development AB, Vargarda, Sweden

[21] Appl. No.: 600,420

[22] Filed: Feb. 13, 1996

[30] Foreign Application Priority Data

Feb. 13, 1995 [DE] Germany ............... 195 04 506.8

[51] Int. Cl.⁶ .................................................. B60R 22/00
[52] U.S. Cl. .................................................. 242/377
[58] Field of Search ........................... 242/377, 548, 242/548.3, 566; 280/806, 807

[56] References Cited

U.S. PATENT DOCUMENTS

| | | | |
|---|---|---|---|
| 4,081,152 | 3/1978 | Henderson | 242/377 |
| 4,106,721 | 8/1978 | Ulrich | 242/377 |
| 4,372,613 | 2/1983 | Kitakami et al. | 280/807 |
| 4,832,280 | 5/1989 | Haland et al. | 242/377 |
| 4,902,041 | 2/1990 | Corbett et al. | 242/377 |
| 5,160,167 | 11/1992 | Fourrey et al. | 280/806 |

FOREIGN PATENT DOCUMENTS 2614472  4/1976  Germany .

Primary Examiner—John P. Darling
Attorney, Agent, or Firm—Robert W. Becker & Associates

[57] ABSTRACT

A safety belt reeling device has a housing and a belt reeling shaft rotatably supported in the housing. A safety belt is connected with one end to the belt reeling shaft so as to be reeled onto and withdrawn from the belt reeling shaft. A safety belt guide is movably connected in the housing between an assembly position and an operational position. The safety belt guide has a guide slot through which the safety belt is threaded during assembly of the safety belt reeling device and in which the safety belt is guided during operation of the safety belt reeling device. The belt reeling shaft has a belt slot and the safety belt is guided through the belt slot and is secured thereat. The safety belt guide during assembly is moved into the assembly position at the periphery of the belt reeling shaft and is secured in the assembly position such that the guide slot is aligned with the belt slot and such that the guide slot and the belt slot are directly adjacent to one another.

5 Claims, 2 Drawing Sheets

SAFETY BELT REELING DEVICE WITH SAFETY BELT GUIDE DESIGNED FOR AUTOMATIC ASSEMBLY

BACKGROUND OF THE INVENTION

The present invention relates to a safety belt reeling device with a belt reeling shaft biased by a spring for winding, respectively, withdrawing the safety belt, wherein the safety belt is connected with one end to the belt reeling shaft. The device further has a safety belt guide which is movably connected to the housing and which encloses the safety belt with its guide slot into which the safety belt must be threaded during assembly.

A safety belt reeling device with the aforementioned features is known from German Published Document 26 14 472. This safety belt reeling device comprises a safety belt guide which is movably arranged within the safety belt housing in order to guide without constant deflection and with low friction, even when unfavorable winding, respectively, withdrawing conditions are present, the safety belt during winding, respectively, withdrawing within the guide slot of the safety belt guide without the safety belt laterally contacting the legs of the U-shaped safety belt reeling device housing. With a safety belt reeling device embodied as disclosed the safety belt must be fastened to the shaft body and must also be threaded into the safety belt guide.

The assembly of such a safety belt reeling device is difficult because first the safety belt must be threaded into the safety belt guide and the safety belt must then be fastened to the body of the belt reeling shaft. For threading the safety belt into the safety belt guide, the guide known from German Published Document 26 14 472 is provided with stays that delimit the guide slot for the safety belt. These stays have a lateral cutout for the lateral insertion of the safety belt. Furthermore, with respect to fastening the safety belt at the body of the shaft, it is known to insert the safety belt from one side into a belt slot provided within the shaft and to fasten at the other side of the belt slot the belt loop, for example, with an inserted pin. Since in the known safety belt reeling devices the belt guide and the shaft body are thus arranged at a distance to one another, the assembly with the prescribed assembly steps is difficult to preform and, due to the distance present between the belt guide and the belt slot, a twisted insertion of the safety belt during threading is always possible.

It is therefore an object of the present invention to improve a safety belt reeling device with the aforementioned features such that the assembly is facilitated and a twisting of the safety belt during assembly can be prevented.

SUMMARY OF THE INVENTION

The safety belt reeling device according to the present invention is primarily characterized by:

a housing;

a belt reeling shaft rotatably supported in the housing;

a safety belt connected with one end thereof to the belt reeling shaft so as to be reeled onto and withdrawn from the belt reeling shaft;

a safety belt guide movably connected in the housing between an assembly position and an operational position, the safety belt guide having a guide slot through which the safety belt is inserted during assembly of the safety belt reeling device and in which the safety belt is guided during operation of the safety belt reeling device;

the belt reeling shaft having a belt slot, wherein the safety belt is guided through the belt slot and is secured thereat; and wherein the safety belt guide during assembly is moved into the assembly position at the periphery of the safety belt reeling shaft and secured in the assembly position such that the guide slot is aligned with the belt slot and such that the guide slot and the belt slot are directly adjacent to one another.

Preferably, the safety belt guide is pivotably connected to the housing.

Advantageously, the safety belt reeling device further comprises a spring acting on the belt reeling shaft in the direction of winding the safety belt onto the belt reeling shaft, wherein the safety belt guide has an abutment and in the assembly position the abutment engages the periphery of the belt reeling shaft so as to lock the belt reeling shaft for threading the safety belt through the guide slot and the belt slot.

In a further embodiment of the present invention the periphery of the belt reeling shaft comprises a recess engaged by the abutment.

Preferably, the housing has a leg with a stamped bead. The safety belt guide has a projection with which it is secured at the stamped bead in the assembly position.

The invention is based on the principle that the safety belt guide for the purpose of assembling the safety belt reeling device can be arrested in a position relative to the periphery of the belt reeling shaft, on which during operation of the safety belt reeling device the safety belt windings are supported, in which position the guide slot is aligned with a belt slot provided within the body of the belt reeling shaft for threading therethrough and for securing thereat the safety belt. The belt slot of the body of the belt reeling shaft and the guide slot of the safety belt guide are directly adjacent to one another. The invention has the advantage that in the assembly position the two slots, i.e., the belt slot within the body of the belt reeling shaft and the guide slot, are positioned directly adjacent to one another and are aligned with one another so that the threading of the safety belt into the safety belt guide and the body of the belt reeling shaft can be preformed in one single step and without running the risk of twisting the safety belt during the threading step. This allows especially for an automated assembly of the safety belt reeling device. After fastening of the safety belt at the body of the safety belt reeling shaft, the assembly position, into which the safety belt guide must be moved for assembly, is released so that the safety belt guide is returned into its operational position. The safety belt reeling device with its safety belt guide is now operational.

According to one embodiment of the invention the safety belt guide is pivotably connected within the housing.

When the safety belt reeling shaft is already prestressed by a winding spring during the respective assembly steps, it must be arrested in its position. Thus, according to a further embodiment of the invention, it is suggested that the safety belt guide engages in its assembly position an abutment at the periphery of the body of the belt reeling shaft and thereby locks the safety belt reeling shaft, prestressed by the winding spring, for threading the safety belt into the belt slot. Thus, advantageously a separate safety member for arresting the prestressed safety belt reeling shaft, which is known in general from the prior art, can be omitted during assembly.

According to another embodiment of the present invention, the body of the belt reeling shaft is provided at its circumference with a recess which is engaged by the abutment of the safety belt guide so that an aligned position of belt slot and guide slot is realized.

For arresting the belt guide at the housing of the safety belt reeling device in the assembly position, according to another embodiment of the invention the housing may be provided with a stamped bead at which the safety belt guide is secured with a projection. The size of the stamped bead and of the projection are selected such that, on the one hand, the secure arresting of the safety belt guide during assembly is ensured and, on the other hand, the safety belt guide can be returned without the need for tools into its operational position simply by sliding the projection across the bead.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENT

The present invention will now be described in detail with the aid of a specific embodiment utilizing FIGS. 1 through 3.

Figure 1:
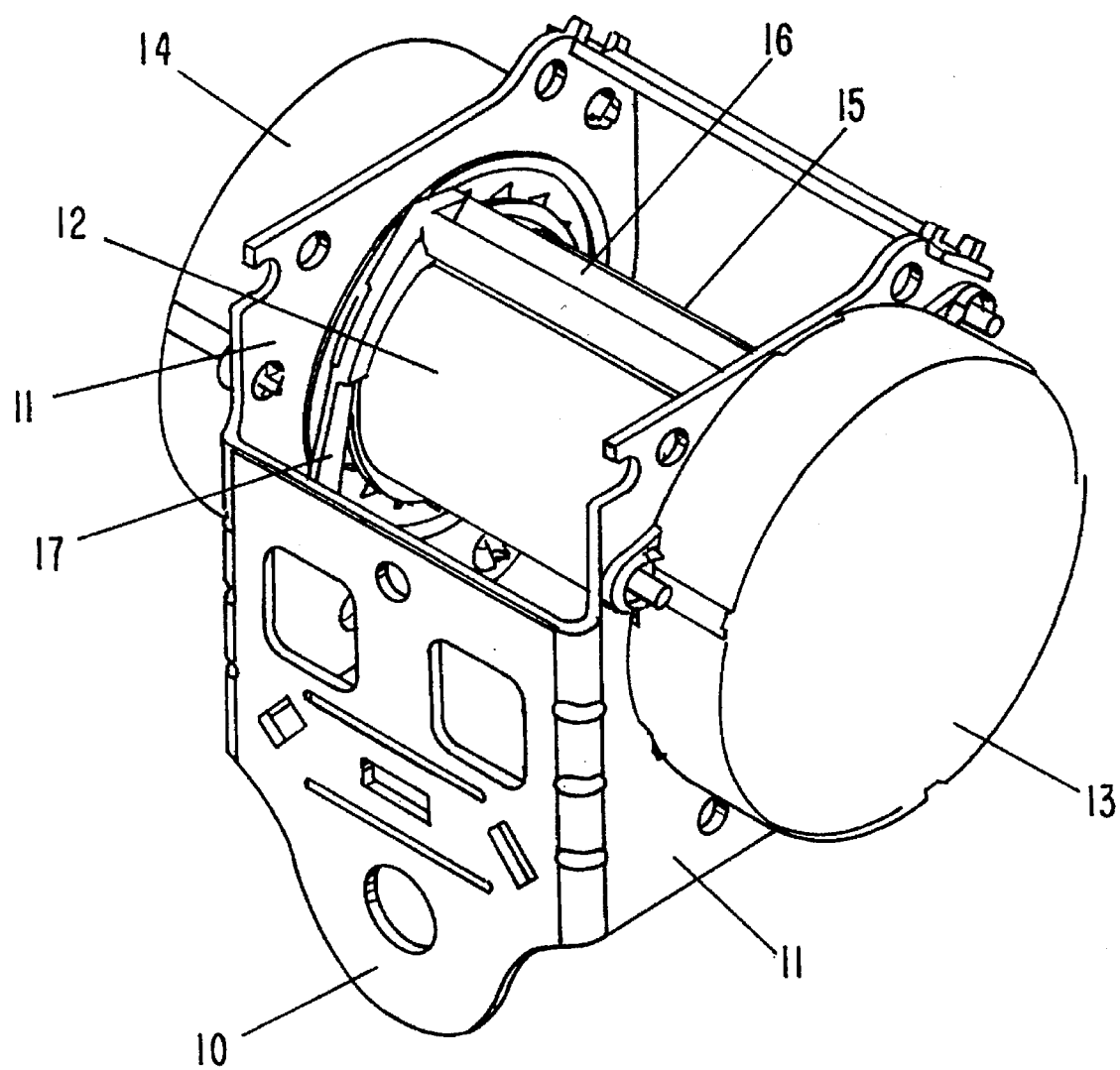
FIG. 1 shows a safety belt reeling device with safety belt guide in a perspective view.

The safety belt reeling device, represented as a whole in FIG. 1, has a U-shaped housing 10 with respective legs 11. The belt reeling shaft 12 is rotatably supported at the two legs 11. Onto the belt reeling shaft 12 the safety belt 20 is wound according to the representation of FIG. 3 and can be withdrawn therefrom. For this purpose, one end of the belt reeling shaft 12 is biased by a control and blocking system which is covered by the cover 14 while the other end of the belt reeling shaft 12 is biased by a winding spring positioned under the spring cover 13. A safety belt guide 15 is pivotably supported at the legs 11 of the housing 10 of the safety belt reeling device at respective arms 17. The safety belt guide 15 comprises a guide slot 16 for enclosing the belt 20 passing therethrough. As can be seen from FIG. 3 which shows the operational position of the safety belt guide 15, the safety belt guide 15 adapts to the diameter of the windings of the safety belt wound onto the belt reeling shaft 12 and in this manner provides for a friction-reduced guiding of the safety belt during winding or withdrawing.

Figure 2:
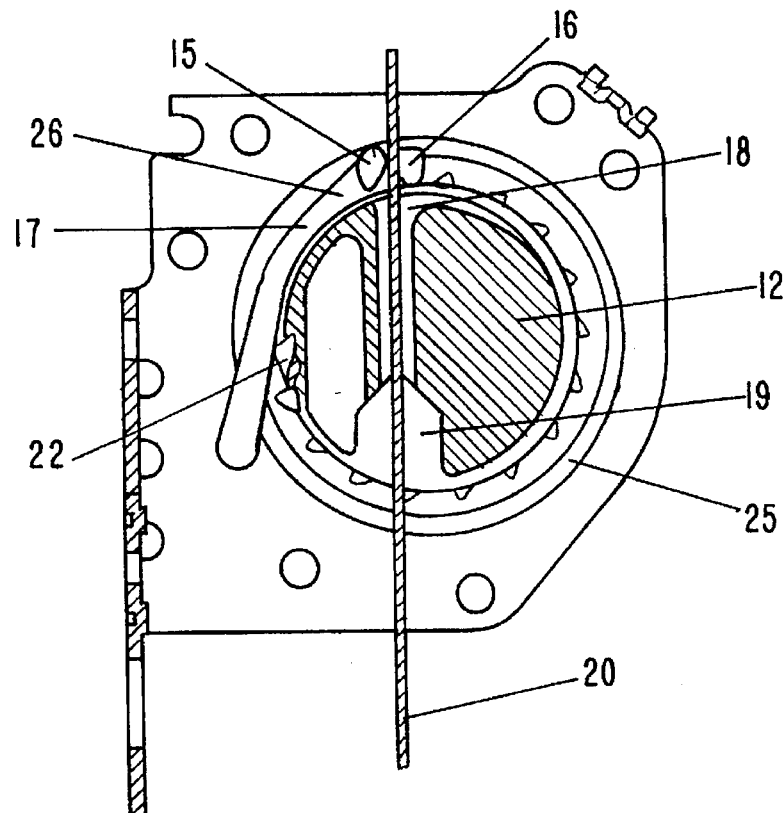
FIG. 2 shows the safety belt reeling device in the assembly position in section.
Figure 3:
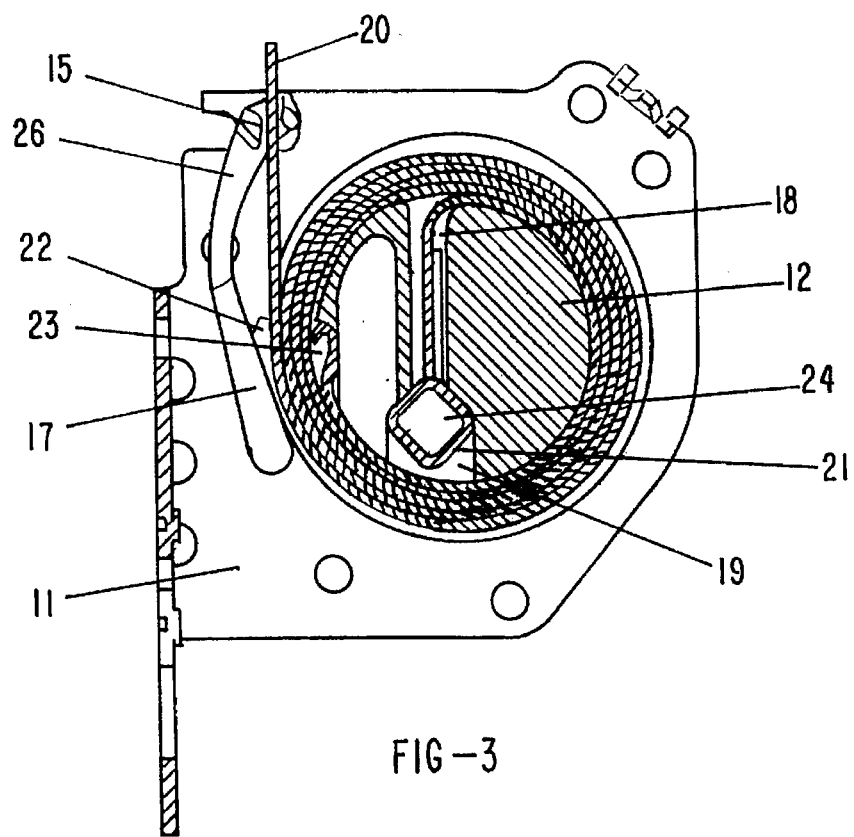
FIG. 3 shows in section the reeling device of FIG. 2 in the operational position.

As can be seen in detail in FIG. 2, the belt reeling shaft 12 is provided with a belt slot 18 for fastening thereat the safety belt 20. The belt slot 18 terminates at one side of the belt reeling shaft 12 in a recess 19 which is retracted into the contour of the belt reeling shaft 12. The recess 19 serves to receive a pin 24 about which the end of the safety belt 20 in the form of a loop 21 is wound. After threading of the safety belt 20 through the belt slot 18 the pin 24 causes the fastening of the safety belt 20 at the belt reeling shaft 12.

As can be seen in FIG. 2, the safety belt guide 15 can be arrested in a position relative to the belt reeling shaft 12 in which the guide slot 16 of the safety belt guide 15 is aligned with the belt slot 18 of the belt reeling shaft 12 so that the safety belt 20 can be threaded in one single assembly step through both components. This makes an automation of this assembly step possible. For arresting the safety belt guide 15 in the assembly position, at least one leg 11 is provided with a stamped bead enclosing the circumference of the belt reeling shaft and projecting in the direction toward the safety belt guide 15. The respective arm 17 of the safety belt guide 15 is provided with a projection 26 which, in the assembly position of the safety belt guide 15 represented in FIG. 2, is positioned at the radially inner side of the stamped bead. This arrangement effects the locking of the safety belt guide 15. For returning the safety belt guide 15 into the operational position represented in FIG. 3, the projection 26 is forced across the stamped bead.

Since the belt reeling shaft 12 during the corresponding assembly steps is already loaded by a winding spring, the safety belt guide 15 has an abutment 22 that engages a recess 23 provided at the circumference of the belt reeling shaft 12 so that a locking of the prestressed belt reeling shaft 12 is realized. Additionally, due to the engagement of the abutment 22 and the recess 23 and due to the spring force acting on the belt reeling shaft 12, a tensioning of the two parts relative to one another result and thus also an arresting of the safety belt guide 15 relative to the belt reeling shaft 12. After completion of the assembly step by fastening the safety belt 20 at the belt reeling device 12, the engagement of the abutment 22 at the recess 23 must be released and the projection 26 must be forced across the stamped bead in order to reach the operational position of the safety belt reeling device.

The present invention is, of course, in no way restricted to the specific disclosure of the specification and drawings, but also encompasses any modifications within the scope of the appended claims.

What I claim is:

1. A safety belt reeling device comprising:

a housing;

a belt reeling shaft rotatably supported in said housing;

a safety belt connected with one end thereof to said belt reeling shaft so as to be reeled onto and withdrawn from said belt reeling shaft;

a safety belt guide movably connected in said housing between an assembly position and an operational position, said safety belt guide having a guide slot through which said safety belt is threaded during assembly of said safety belt reeling device and in which said safety belt is guided during operation of said safety belt reeling device;

said belt reeling shaft having a belt slot, wherein said safety belt is guided through said belt slot and is secured thereat; and wherein said safety belt guide during assembly is moved into said assembly position at the periphery of said belt reeling shaft and secured in said assembly position such that said guide slot is aligned with said belt slot and such that said guide slot and said belt slot are directly adjacent to one another.

2. A safety belt reeling device according to claim 1, wherein said safety belt guide is pivotably connected to said housing.

3. A safety belt reeling device according to claim 1, further comprising a spring acting on said belt reeling shaft in a direction of winding said safety belt onto said belt reeling shaft, wherein said safety belt guide has an abutment and wherein in said assembly position said abutment engages the periphery of said belt reeling shaft so as to lock said belt reeling shaft for threading said safety belt through said guide slot and said belt slot.

4. A safety belt reeling device according to claim 3, wherein the periphery of said belt reeling shaft comprises a recess engaged by said abutment.

5. A safety belt reeling device according to claim 4, wherein:

said housing has a leg with a stamped bead;

said safety belt guide has a projection; and said safety belt guide is secured with said projection at said stamped bead in said assembly position.

* * * * *